United States Patent [19]

Okabe

[11] 4,073,984
[45] Feb. 14, 1978

[54] METHOD FOR IMPARTING A LUSTROUS TOP SURFACE TO ARTIFICIAL LEATHER

[75] Inventor: Kenji Okabe, Osaka, Japan

[73] Assignee: Toyo Cloth Co., Ltd., Osaka, Japan

[21] Appl. No.: 678,178

[22] Filed: Apr. 19, 1976

[30] Foreign Application Priority Data

Oct. 3, 1975 Japan .............................. 50-119641

[51] Int. Cl.² .......................... B05D 3/12; B05D 7/04
[52] U.S. Cl. .................................. 427/444; 427/359; 427/370
[58] Field of Search .............. 427/245, 444, 359, 370

[56] References Cited

U.S. PATENT DOCUMENTS

| 3,034,927 | 5/1962 | Fairclough et al. ............... 427/245 |
| 3,770,481 | 11/1973 | Canat .............................. 427/245 X |

*Primary Examiner*—James R. Hoffman
*Attorney, Agent, or Firm*—Haight & Huard

[57] ABSTRACT

A lustrous top surface is imparted to artificial leather having a substrate, a flexible thermoplastic layer and a top coating essentially consisting of a thermoplastic resin by contacting the top coating with a mirror-like surface for a short period of time while applying heat to the intersurface therebetween at a temperature of at least about 10° C but not more than 40° C lower than the softening point of the resin in the top coating.

7 Claims, No Drawings

METHOD FOR IMPARTING A LUSTROUS TOP SURFACE TO ARTIFICIAL LEATHER

This invention relates to a method for imparting a lustrous top surface to artificial leather.

Artificial leathers have been made commercially by laminating a flexible layer of a thermoplastic resin such as polyvinylchloride, polyamide, polyurethane or the like onto a suitable substrate such as textile fabric, nonwoven fabric, plastic film, paper or the like. Usually they have been provided on their top surface with finishes or top coatings by applying a solution or dispersion of a thermoplastic resin and then drying. Pin-holes or otherwise formed uneveness on the top surface tends to scatter light and therefore, makes the artificial leather less lustrous and less intense in color than leather which has been finished by ironing.

As just-mentioned above, leather may be polished by ironing under heat and pressure. This conventional technique cannot be applied to the artificial leather of the above-mentioned type because friction under heat and pressure will destroy its interior cellular structure and cause melting or deterioration of the finish.

This is particularly true where the artificial leather has been post-embossed.

The present invention provides a method for imparting a lustrous top surface to artificial leather of the type comprising a substrate, a flexible layer of a thermoplastic resin and a top coating consisting essentially of a thermoplastic resin which comprises contacting said top coating with a mirror-like surface for a short period of time while applying heat to the intersurface therebetween at a temperature as at least about 10° C but not more than about 40° C lower than the softening point of the resin in the top coating. Pressure should not be applied in excess to uniformly extend the artificial leather over the mirror-like surface so that the original interior texture or patterns, if the artificial leather has been post-embossed, is maintained.

The artificial leather to be subjected to the method of the present invention may be produced by conventional methods. Examples of substrate are woven or knitted textile fabrics, nonwoven fabrics, plastic films, papers or the like. To the substrate is laminated a layer of a thermoplastic resin such as polyvinychloride, vinyl chloride-acetate copolymer, polyamide, polyurethane or the like, or a blend of such resins with a synthetic rubber such as styrene-butadiene copolymer or acrylonitrilebutadiene copolymer by the conventional methods such as calendering, transferring or casting. This resin layer may be either open or closed cellular foam. For details for the production of artificial leather having cellular structure, reference is made to U.S. Pat. No. 3,939,021 issued to Yoshifumi Nishibayashi et al. and the references cited therein.

Materials for the top coating preferably have a softening point slightly lower than that of the resins used in the laminate and exhibit good adhesion thereto. Examples of suitable thermoplastic resins to be used for the top coating are N-alkoxymethylated polyamide, copolymer of capramide-hexamethyleneadipamide-hexamethylenesebacamide, polyacrylate, polymethacrylate, polyester type polyurethane elastomer, polyether type polyurethane elastomer, polyglutamate, vinylchloride-vinylacetate copolymer and the like. The top coating may be formed onto the artificial leather by applying a solution or dispersion of said thermoplastic resin in a suitable solvent in a conventional manner and drying.

The solution or dispersion may contain further conventional components such as colorant, surface active agent, silicone or antistatic agent.

Mirror-like surfaces used for the method in accordance with this invention include a roller, plate or endless belt made of iron or steel having a continuous smooth surface. Such smooth surface may be formed by super-finishing, plating with chromium, nickel, tin, zinc or cadmium, or resin-lining with fluorocarbon resin or silicone resin by means of baking. The roller may be lined by fabricating a tubular wall of fluorocarbon or silicone resin by extrusion or casting and then fitting the roller therein.

Examples of suitable resins for the lining are polytrifluoroethylene, polydimethylsiloxane, polymethylphenylsiloxane, polymethylvinylsiloxane, polycyanoalkylmethylsiloxane and polyfluoroalkylmethylsiloxane. Alternatively, plates or endless belts made of said fluorinated hydrocarbon resins or silicone resins can be employed and polytetrafluoroethylene may be used for this purpose which is not suitable for lining a metallic roller or plate.

The top coating of the artificial leather is then contacted with the mirror-like surface. This may be preferably performed by pressing a plate having the mirror-like surface against the top coating of the artificial leather, or passing the top coating on a moving mirror-like surface of a rotating roller or running an endless belt in the same direction at the same linear velocity relative to the mirror-like surface.

Thus, static friction is avoided between the top coating and the mirror-like surface.

During this step, heat is applied to the intersurface between the top coating and the mirror-like surface at a temperature as at least about 10° C but not more than about 40° C below the softening point of the top coating. A treating temperature above said range tends to adhere the top coating to the mirror-like surface or destroy patterns which have been post-embossed prior to the application of the top coating, while a treating temperature below said range is too low to impart a lustrous surface structure to the artificial leather.

Application of heat may be accomplished by heating said plate, endless belt or roller to the appropriate temperature. Alternatively, the top coating may be contacted while hot with a cold or hot mirror-like surface. Other means may be employed for the application of heat to the intersurface, for example, by enclosing the treating site with a suitably hot ambient atmosphere.

A suitable length of time during which the top coating is contacted with the mirror-like surface varies with the particular temperature within the aforementioned range and is generally for 3 to 40 seconds, preferably for 5 to 40 seconds. Higher temperatures within said range require relatively shorter periods of time and the lower temperatures require longer periods of time.

Care should be taken so that excess pressure will not be exerted in on the top surface, since excessively strong pressure will cause rupturing of interior cells or diminishing of post-embossed patterns.

The weight of the plates themselves or of the longitudinal driving force for pulling the artificial leather on the roller or belt is sufficient to force the top coating against the mirror-like surface without a gap therebetween.

Thus, the appearance of the artificial leather may be greatly improved by the sparkling effect of the top coating and a more intense color may be obtained.

If post-embossed artificial leather is treated with the method of the present invention, only prominent portions become lustrous while other portions remain dull. This gives a sharp contrast between the patterns and the background.

The following examples further illustrate the invention. All parts and % in the examples are by weight.

EXAMPLE 1

A 30% solution of polyester type polyurethane elastomer (average MW = 12,000) in a 7 : 3 mixture of dimethylformamide and methyl ethyl ketone was applied to a commercially available release paper at a rate of 3 g./m$^2$ (dry basis) and then dried at 120° C for 5 minutes.

A 50% solution of cross-liked polyurethane elastomer (mixture of 1 mol of polyethylene adipate having terminal hydroxy groups and an average MW of 9,000 and 5 mols of an adduct of 1 mol of trimethylolpropane with 3 mols of tolyulenediisocyanate) in a mixture of dimethylformamide, methyl ethyl ketone and toluene at a ratio of 4 : 3 : 3 was applied onto the coated surface at a rate of 100 g./m$^2$ (dry basis) to form an adhesive layer. The resulting sheet was laminated with a raised textile fabric and the laminate was dried to complete curing of the adhesive layer. Then the release paper was stripped off.

A 15% solution of a polyester type polyurethane elastomer (average MW = 8,000, softening point = 155° C) in methyl ethyl ketone was applied onto the top surface of the laminate at a rate of 3 g./m$^2$ (dry basis) and then dried at 100° C for 5 minutes to form a top coating.

The resulting artificial leather was extended on a flat base with the top coating being exposed. A chromium plated iron sheet was heated to 125° C and placed on the artificial leather with the chromium plating facing the top coating for 15 seconds under a pressure of 1 g./cm$^2$ The iron sheet was removed and the treated artificial leather was cooled to room temperature.

The degrees of luster of the treated and untreated artificial leather in terms of a degree of luster at 60° were measured respectively, according to a method for measuring degree of luster of mirror surfaces described in JIS-Z-8741 using a three-dimensionally varying angle photometer (Model JSG-21, Johnan Seisakusho, Japan). The values obtained were 27.2% and 58.2% before and after the treatment respectively.

The above-described treatment was repeated at various temperatures and the degree of luster was measured at each time as tabulated below.

| Temperature ° C | 120 | 125 | 131 | 135 | 140 |
|---|---|---|---|---|---|
| Degree of luster in terms of at 60° (%) | 27.4 | 58.2 | 58.2 | 58.0 | 57.5 |

EXAMPLE 2

Polyester type polyurethane elastomer (average MW = 10,000) and calcium carbonate were added to a mixture of dimethylformamide and ethyl acetate (1 : 4) to a concentration 15% and 30% respectively.

The resulting dope was applied onto a raised textile fabric at a rate of 25 g./m$^2$ (dry basis), and then dried at 120° C for 5 minutes. A 20% solution of the polyester type polyurethane elastomer in dimethylformamide was applied on the first coating layer at a rate of 50 g./m$^2$ (dry basis), soaked in a water bath at 50° C for 30 minutes and then dried at 140° C for 5 minutes.

A 30% solution of cross-linked polyurethane elastomer (mixture of 1 mol of polyethylene adipate having terminal hydroxy groups and average MW of 5,000 and 7 mols of an adduct of 1 mol of glycerol and 3 mols of diphenylmethanediisocyanate) in ethyl acetate was applied onto the second coating layer at a rate of 20 g./m$^2$ (dry basis) and dried at 120° C for 5 minutes.

A solution containing 18% of polyamide (a 6 : 4 mixture of N-methoxymethylated polycapramide having a degree of methoxymethylation of 28 mol % and an equimolar copolymer of capramide-hexamethyleneadipamide-hexamethylenesebacamide, softening point 160°) and 3% of carbon black in methanol was applied on the coating layer at a rate of 3.6 g./m$^2$ and dried at 90° C for 3 minutes.

Finally a 20% solution of said polyamide in methanol was applied on the resulting layer at a rate of 6 g./m$^2$ and dried at 90° C for 3 minutes. The top coating of the resulting artificial leather was treated with a chromium plated iron sheet in the same manner as Example 1 at 140° C for 5 seconds. The degree of luster at 60° before and after the treatment was 27.0% and 56.3% respectively.

EXAMPLE 3

A organosol consisting of 100 parts of polyvinylchloride (average MW = 50,800), 60 parts of dioctyl phthalate and 5 parts of gasoline was applied onto a knitting substrate at a rate of 100 g./m$^2$ (dry basis) and dried at 100° C for 3 minutes. A layer of a polymer blend consisting of 100 parts of polyvinylchloride, 30 parts of butadiene-acrylonitrile copolymer, 90 parts of dioctyl phthalate and 4 parts of azodicarbonamide was laminated at a rate of 500 g./m$^2$ by calendering at 130° C.

A plastisol consisting of 100 parts of polyvinylchloride, 90 parts of dioctyl phthalate and 25 parts of calcium carbonate was then applied on the resulting layer at a rate of 290 g./m$^2$.

A 15% solution of a mixture of 70 parts of vinylchloride-vinylacetate copolymer (85 : 15) with, 30 parts polymethylmethacrylate (softening point 85° C) in methyl ethyl ketone was applied as the top coating and the resulting laminate was heated at 215° C for 60 seconds to produce an artificial leather having a layer of foam.

The resulting artificial leather was driven on a chromium plated roller (2 m in diameter) rotating at the same circumferential linear speed as the artificial leather while the temperature of the roller was maintained at 70° C. The driving speed was adjusted so that the top coating was contacted with the roller for 30 seconds under a pressure of 3 g./cm$^2$ (driving force 30 kg/m). The degree of luster at 60° C before and after the treatment was 31.1% and 69.7% respectively.

Alternatively, the untreated artificial leather was extended on a stationary base and contacted with a polytrifluoroethylene plate 5 mm thick heated to 50° C for 7 seconds under a pressure of 2 g./cm$^2$ at a surface temperature of 65° C. The same treatment was repeated except that a polydimethysiloxane plate 10 mm thick was used in place of the polytrifluoroethylene plate under a pressure of 10 g./cm$^2$.

The degree of luster obtained in each treatment was 57.4% and 54.9% respectively.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for imparting lustre to the top surface of an artificial leather comprising a laminate of a substrate, a cellular foam thermoplastic resin and a top coating of a thermoplastic resin having a softening point lower than that of said cellular foam, which process comprises:

contacting the surface of said top coating with a smooth surface at a temperature of 10°-40° C below the softening point thereof for about 3-40 seconds while avoiding static friction between the top coating and said smooth surfact at a pressure insufficient to rupture the cells of said foam to substantially increase the degree of lustre of said top coating.

2. A method according to claim 1, wherein said resin for the top coating is selected from the group consisting of N-alkoxymethylated polyamide, copolymer of capramide-hexamethyleneadipamide-hexamethylenesebacamide, polyacrylate, polymethacrylate, polyester type polyurethane, polyether type polyurethane, polyglutamate, and vinylchloride-vinylacetate copolymer.

3. A method according to claim 1, wherein said smooth surface forms a plane, and said top coating is contacted therewith stationarily.

4. A method according to claim 1, wherein said smooth surface forms a moving continuous surface, and said top coating is contacted therewith while moving at the same linear speed as that of said moving surface.

5. A method according to claim 1, wherein said period of time is 3 to 40 seconds.

6. A method according to claim 1, wherein said artificial leather has been post-embossed.

7. A method according to claim 1, wherein said artificial leather includes a layer of closed cellular foam.

* * * * *